United States Patent [19]

Drory

[11] Patent Number: 5,319,703
[45] Date of Patent: Jun. 7, 1994

[54] APPARATUS AND METHOD FOR IDENTIFYING SPEECH AND CALL-PROGRESSION SIGNALS

[75] Inventor: Eatamar Drory, Santa Clara, Calif.

[73] Assignee: VMX, Inc., San Jose, Calif.

[21] Appl. No.: 889,513

[22] Filed: May 26, 1992

[51] Int. Cl.⁵ .............................................. H04M 1/00
[52] U.S. Cl. ..................................... 379/351; 379/386; 379/84; 379/86; 381/41; 381/46; 370/110.3
[58] Field of Search ................... 379/84, 386, 351, 86; 381/46, 41, 110; 370/110.3

[56] References Cited

U.S. PATENT DOCUMENTS

| 4,223,185 | 9/1980 | Picou | 379/84 |
| 4,354,248 | 5/1982 | Kawaguchi et al. | 379/84 |
| 4,477,698 | 10/1984 | Szlam et al. | 179/90 |
| 4,521,647 | 6/1985 | Olson et al. | 379/84 |
| 4,534,041 | 8/1985 | Münter | 379/386 |
| 4,599,495 | 7/1986 | Richards | 379/351 |
| 4,677,665 | 6/1987 | Walker | 379/386 |
| 4,689,760 | 8/1987 | Lee et al. | 370/110.3 |
| 4,979,214 | 12/1990 | Hamilton | 379/386 |

OTHER PUBLICATIONS

Alan V. Oppenheim and Ronald W. Schafer, Digital Signal Processing, Prentice-Hall, Inc., pp. 287-289, 1975.
Dialogic, "Customizing D/41 Call Analysis," Application Note AN002, pp. 1-101, 1988, 1989.
L. R. Rabiner and R. W. Schafer, Digital Processing of Speech Signals, Prentice Hall, Inc., 1978, LC Call No. TK7882.S65 R3, ISBN #0132136031.
R. E. Blahut, Fast Algorithms for Digital Signal Processing, Addison Wesley, 1987, LC Call No. TK5102.5 .B535 1985, ISBN #0201101556.

Primary Examiner—James L. Dwyer
Assistant Examiner—Jacques M. Saint-Surin
Attorney, Agent, or Firm—Haverstock, Medlen & Carroll

[57] ABSTRACT

A method for real-time recognition of speech and call-progression tone energy includes the steps of digitizing an analog signal present on a signal line, correlating N neighboring portions of the digitized signal, performing FFT analysis on the digitized signal, identifying the three largest frequency-domain maxima, determining whether the two largest maxima are above a threshold frequency, and determining whether the ratio of the largest to the third largest maxima exceeds a predetermined value. According to the present invention, the steps of the method may be performed in real time using fixed-point hardware by approximating the correlation and FFT functions.

13 Claims, 3 Drawing Sheets

APPARATUS AND METHOD FOR IDENTIFYING SPEECH AND CALL-PROGRESSION SIGNALS

BACKGROUND OF THE INVENTION

1. Field Of The Invention

The present invention relates digital signal processing and to apparatus and methods for identifying speech and tone energy on a signal line. More particularly, the present invention relates to apparatus and methods for identifying and discriminating between tones, such as DTMF tones, dial tones, busy signals and other tones used in telephone systems, and speech energy on a signal line.

2. The Prior Art

While numerous theoretical models of speech may be found in the literature, real-time identification of electrical energy as comprising human speech presents a challenge. Real-world, real-time applications of speech-recognition often have low tolerance for false positive and false negative speech-present decisions. An example of such an application is in PBX and other telephone applications, where human speech and call-progression tones are expected to be encountered on the same line within adjacent time windows. There is a need in such systems to accurately identify and distinguish between both call-progression tones and speech components of electrical energy present on a signal line for controlling the operation of the PBX or other control system. The use of false positive and false negative speech-present or tone-present determinations to control the operation of such a system can render a product commercially undesirable. In the ideal case, apparatus capable of reporting the presence of speech or call-progression tones on a signal line would have an accuracy of 100%, however, this goal has not been achievable using prior art technology.

BRIEF DESCRIPTION OF THE INVENTION

According to the present invention, apparatus and a method for real-time identification of electrical energy on a signal line as human speech or as call-progression tone energy, achieves a higher degree of accuracy than is possible using prior art techniques. According to a presently preferred embodiment of the invention, a method for real-time recognition of speech and call-progression tone energy includes the steps of digitizing an analog signal present on a signal line, correlating N neighboring portions of the digitized signal, performing frequency analysis using fast fourier transform (FFT) analysis on the digitized signal, identifying the three largest frequency-domain maxima, determining whether the two largest maxima are above a threshold frequency, and determining whether the ratio of the largest to the third largest maxima exceeds a predetermined value. According to the present invention, the steps of the method may be performed in real time using fixed-point hardware by approximating the correlation and FFT functions.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Speech may be divided into two components. A first voiced component comprises the English language vowel sounds, and consonants such as "m" "n" etc. A second unvoiced component comprises sounds such as "sh" "th" "p" and "t". While the unvoiced sounds are characterized by little or no correlation, the voiced sounds in speech are highly correlated in the intervals of their pitch. Such a feature recommends the use of correlation techniques as a component of a speech identification method.

Certain applications, notably telecommunications, require reliable detection and identification of both speech sounds and tones, such as call progression tones. Because call progression tones, usually unmodulated sinusoidal tones, are ideally perfectly correlated and practically highly correlated, correlation techniques alone cannot be used to discriminate between speech sounds and tones such as call-progression signals on communications lines.

According to the present invention, a combination of digital real-time signal processing techniques implemented in fixed-point hardware may be employed to readily differentiate between speech sounds and call progression tones. The method of the present invention provides a reliable and economically viable solution to the speech recognition problem. From the description presented herein, those of ordinary skill in the art will recognize that the method of the present invention could be performed by an appropriately programmed personal computer, such as an IBM compatible computer equipped with a 386 processor. Particular software coded instruction routines for carrying out an actual embodiment of the present invention may be easily provided by those of ordinary skill in the art as a routine exercise.

Figure 1:
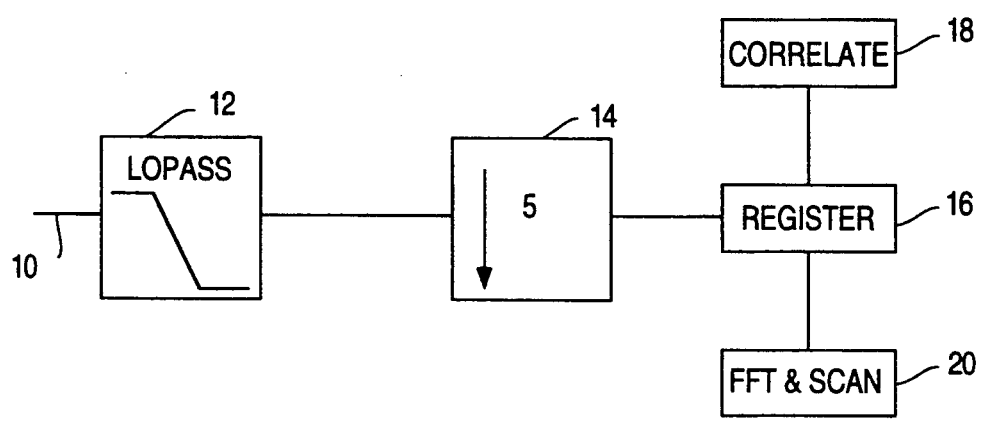
FIG. 1 is a functional block diagram of apparatus for performing the method of the present invention.

Referring first to FIG. 1, a symbolic representation of apparatus according to the present invention is presented. A signal line 10 to be monitored carries a digitized signal which is to be identified. As those of ordinary skill in the art will readily appreciate, this digitized signal may be in PCM format, sampled at a rate of 8,000 samples/sec. Codec apparatus for creating such signals from analog signals is well known and widely used in the art and consequently need not be disclosed herein.

The digitized signal is first processed through low-pass digital filter 12. According to a presently preferred embodiment of the invention, low-pass digital filter 12 may have a linear rolloff characteristic curve in which attenuation begins at 700 Hz and is complete at 800 Hz. Digital filter technology for provision of such a filter is conventional and well understood.

The filtered digital signal is then decimated in circuit block 14 using conventional decimation techniques, preferably by taking every fifth sample, resulting in a data sample rate out of block 14 of 1,600 samples/sec. Those of ordinary skill in the art will recognize that the data samples may be placed in a register 16 for holding while they are processed according to the present method.

According to a presently preferred embodiment of the invention, the digital signal is then subjected to both correlation (block 18) and FFT analysis (block 20). Both of these forms of digital signal processing are well known to those of ordinary skill in the art and are described in texts such as L. R. Rabiner and R. W. Schafer, Digital Processing of Speech Signals, Prentice Hall, 1978, and R. E. Blahut, Fast Algorithms for Digital Signal Processing, Addison Wesley, 1987. Both of these works are expressly incorporated by reference herein. The results of both the correlation and FFT signal processing steps are evaluated to determine if the energy represented by the digital signal on line 12 comprises speech, tone energy, or noise.

Figure 2:
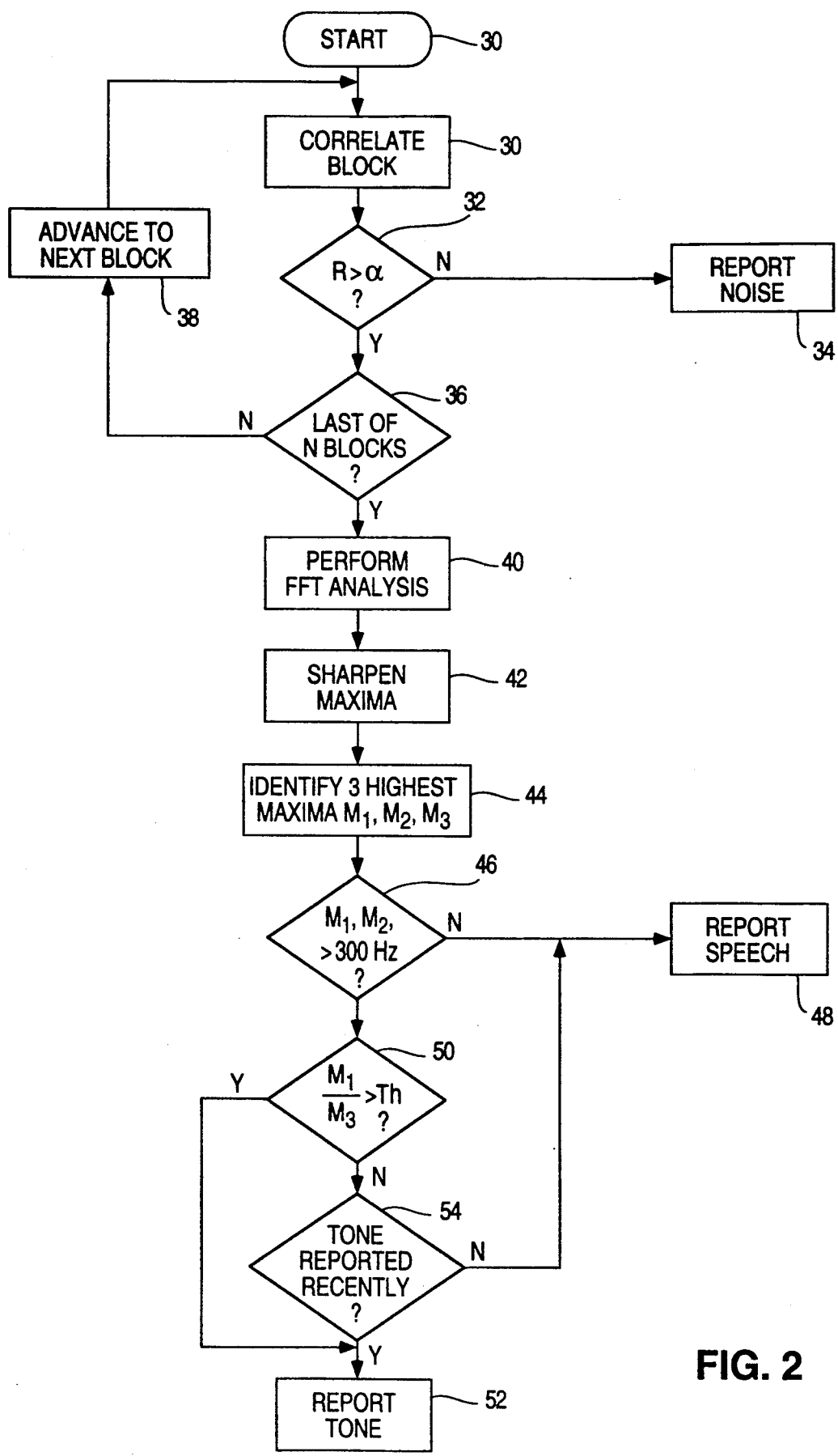
FIG. 2 is a flow diagram showing the steps of a method according to a presently preferred embodiment of the invention.

A flow diagram representing a method according to a presently preferred embodiment of the invention is depicted in FIG. 2. First, at step 30, correlation is performed on a first block of the data samples. Correlation $R_{xx}(k)$ of two signal samples may be expressed as:

$$R_{xx}(k) = \sum_{n=0}^{N-1} x(n) \cdot x(n+k) \div \left[ sqrt \sum_{n=0}^{N-1} x(n)^2 \cdot sqrt \sum_{n=0}^{N-1} x(n+k)^2 \right] \quad [1]$$

According to the present invention, the correlation lag k is chosen to be within the range of human pitch, i.e., between about 2.5 to 20 msec. In addition, the correlation length is chosen to be at least as long as the maximum human pitch, i.e., about 20 msec. At a sample rate of 1,600 samples/sec., the correlation length should be preferably at least 32 samples. These correlation parameters may be easily specified in a conventional software routine for performing correlation.

Those of ordinary skill in the art will recognize that, in order to be able to perform this digital signal processing economically in real time in a fixed-point hardware environment such as an IBM compatible personal computer, some approximations will need to be employed to simplify the amount of data processing required by the signal processing hardware. According to a presently preferred embodiment of the invention, the maximum R is first determined by employing only the numerator of eq. [1]. At the k value of that maximum R, the function R(k) may be estimated by taking the arithmetic mean rather than the geometric mean specified by the denominator of eq. [1], thus significantly simplifying the amount of processing necessary.

Next, at step 32, the correlation result is compared with a predetermined threshold α to determine if there is a possibility that the energy on the line comprises speech. As presently preferred, the threshold may be between about 0.6 and 0.8. To further simplify the signal processing operations, it is preferable to avoid division operations by multiplying α by the arithmetic mean and comparing it with the numerator of eq. [1]. If the correlation result is below the threshold value of α, noise is reported at step 34.

There exists the possibility that, even in uncorrelated signals, one random region of a signal will correlate well with a second random region. To avoid false positive results obtained by encountering such glitches, it would be preferable to perform the correlation operation on several consecutive data blocks offset by a time $T_0$, which may be about 10 to 20 msec. If the correlation is below threshold for one or more of the correlation passes, the signal is determined to comprise noise. If the correlation is above threshold for all three passes, there is either speech or tone energy on the line. Steps 36 and 38 illustrate the repetition of the correlation step for N blocks. As previously stated, the presently preferred value for N is 3.

As previously noted, the results of the correlation operation indicate the possibility of speech energy, but can also indicate the presence of call-progression tone energy. Therefore, according to the present energy, the digital signal is also subjected to FFT analysis at step 40 to make the final determination regarding whether speech or tone energy is present on the line.

It is preferable to perform the FFT analysis with sufficient resolution to identify individual tones. At a sample rate of 1,600 samples/sec., an FFT length of 128 will produce a resolution of 12.5 Hz, which is satisfactory for the application disclosed herein. FFT analysis of digital signals is well known.

Next, at step 42, the FFT analysis results may be "sharpened" according to a presently preferred embodiment of the invention under some conditions. Because of the overlapping band coverage of the FFT process, the frequency response at frequencies between the center bandwidth points defined by the FFT are attenuated and may introduce some ambiguity into the determination. According to this aspect of the invention, the maxima are "sharpened" before the maxima are evaluated.

The three highest frequency maxima $M_1$, $M_2$, and $M_3$ are identified at step 44. If the largest or second largest maxima are found to fall below 300 Hz at step 46, speech is identified at step 48 because call progression tones having a frequency of less than 300 Hz are not likely to be employed. If none of the two highest maxima $M_1$ and $M_2$, fall below 300 Hz, the largest maxima $M_1$ is compared with the third highest maxima $M_3$ at step 50. If the ratio exceeds the threshold, the third maxima is significantly lower energy than the first maxima and the energy is identified as a dual tone at step 52. If the ratio of the first and third maxima is below a preselected threshold (i.e., about 8-10 db) the energy may be identified as speech.

Finally, it has been discovered that if a tone is sampled in the time region where it is turned off, there exists the possibility that speech energy can be mistakenly identified. In order to minimize this possibility, the decision to identify speech in an embodiment having a block length of 16 msec can be deferred until three correlations have been reported above threshold and that the FFT analysis has not reported tone energy from the last few, i.e., four, blocks analyzed. This is illustrated at block 54.

Figure 3:
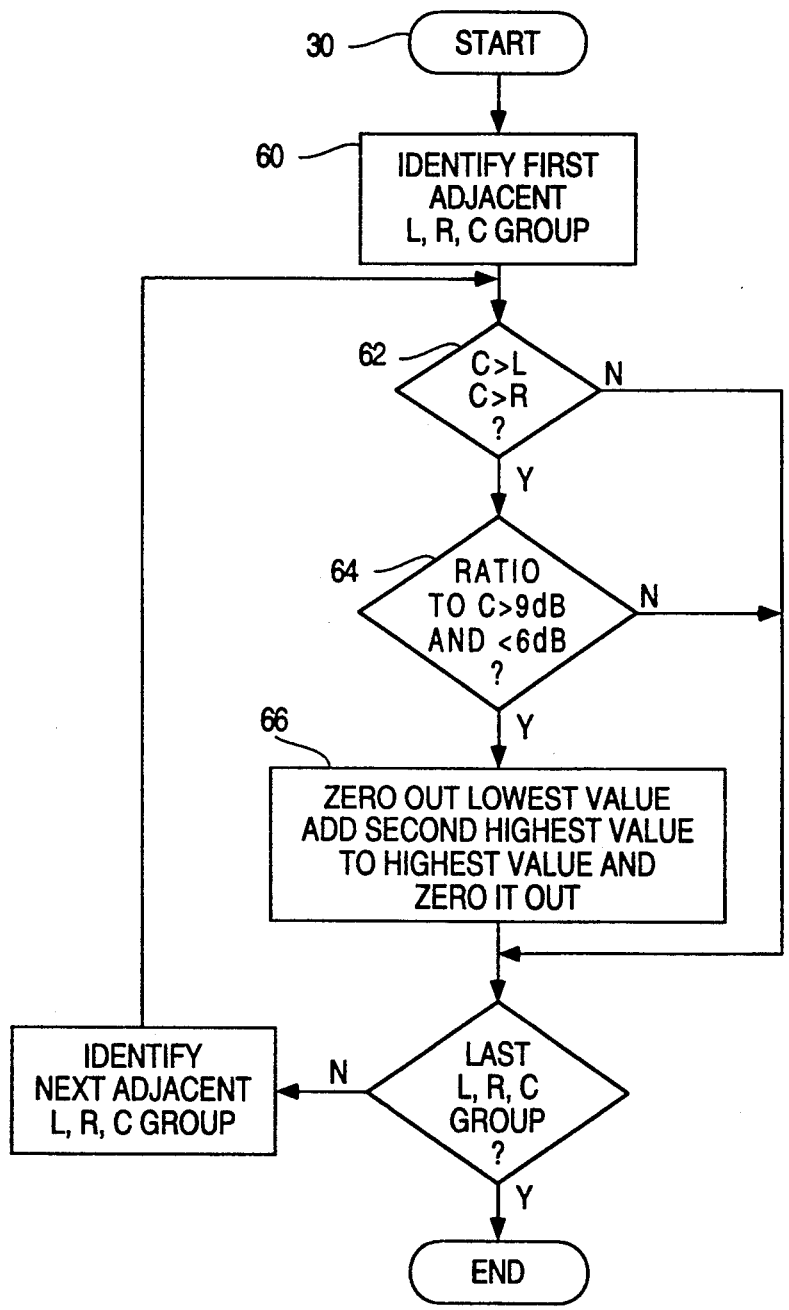
FIG. 3 is a block diagram illustrating a presently preferred method for sharpening the FFT maxima.

Referring now to FIG. 3, a block diagram illustrates a presently preferred method for sharpening the FFT maxima. The amplitude of the FFT results in adjacent frequency bands are evaluated in groups of three selected in step 60. The magnitude of each band is compared with its right and left hand neighbors in step 62. If, at step 64, it is determined that the center bandwidth has the largest magnitude and the ratio of the center bandwidth to one of its right or left hand immediate neighbors is greater than 9 db and the ratio to the other immediate neighbor is less than 6 db, then the amplitude of the second highest value is added to the amplitude of the highest value and then that second highest band is zeroed out in step 66. At step 68, it is determined whether all groups of three adjacent maxima have been evaluated. If there are no more groups to evaluate, the process terminates. If additional groups exist, at step 70 the next group is identified and the process returns to step 62.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for performing real-time recognition of speech and call-progression tones from electrical energy on a signal line including the steps of:
   a. providing a digitized signal representing electrical energy on a signal line;
   b. correlating N neighboring portions of the digitized signal and reporting no speech present if the correlation does not exceed a predetermined threshold;
   c. performing Fast Fourier Transform analysis on the digitized signal and identifying a first, a second, and a third largest frequency-domain maxima;
   d. determining whether the first and second largest maxima are above a threshold frequency and reporting speech present if either the first or the second largest maxima are below the threshold frequency; and
   e. determining whether a ratio of the first largest maxima to the third largest maxima exceeds a predetermined value and reporting a tone present if the ratio is larger than the predetermined value, and reporting noise present if the ratio is smaller than the predetermined value.

2. The method as claimed in claim 1 wherein the threshold frequency is 300 Hz.

3. An apparatus for performing real-time recognition of speech and call-progression tones from electrical energy on a signal line comprising:
   a. means for receiving a first plurality of digitized signal samples representing electrical energy on a signal line;
   b. means for attenuating the digitized signal samples and forming a filtered signal, the means for attenuating coupled to the means for receiving;
   c. means for decimating the filtered signal and forming a decimated signal, the means for decimating coupled to the means for attenuating;
   d. means for correlating a second plurality of neighboring portions of the decimated signal and calculating a maximum, the means for correlating and calculating coupled to the means for decimating;
   e. first means for determining if the maximum exceeds a first predetermined threshold and reporting noise present if the predetermined threshold is not exceeded, the means for determining coupled to the means for correlating and calculating;
   f. means for performing a Fast Fourier Transform analysis of the decimated signal and identifying a first, a second and a third largest frequency-domain maxima, the means for performing coupled to the first means for determining;
   g. second means for determining if both the first and second largest frequency-domain maxima exceed a second predetermined threshold and reporting speech present if either the first or the second largest frequency-domain maxima exceed the second predetermined threshold, the second means for determining coupled to the means for performing a Fast Fourier Transform; and
   h. third means for determining whether a ratio of the first largest to the third largest frequency-domain maxima exceeds a third predetermined value and reporting a tone present if the ratio is larger than the third predetermined value, the third means for determining coupled to the second means for determining.

4. The apparatus as claimed in claim 3 wherein the means for attenuating comprises a low-pass digital filter where attenuation begins at 700 Hz and is complete at 800 Hz.

5. The apparatus as claimed in claim 4 wherein the means for decimating takes every fifth sample.

6. The apparatus as claimed in claim 5 further comprising a register for storing data samples while they are being processed, the register coupled to the means for decimating and the means for correlating.

7. The apparatus as claimed in claim 6 wherein the first predetermined threshold is a value taken from the range of values beginning at 0.6 and ending at 0.8.

8. The apparatus as claimed in claim 7 wherein the plurality of neighboring portions comprises 3 neighboring portions.

9. The apparatus as claimed in claim 8 wherein the second predetermined threshold is equal to 300 Hz.

10. An apparatus for performing real-time recognition of speech and call-progression tones from electrical energy on a signal line comprising:
   a. means for receiving a first plurality of digitized signal samples representing electrical energy on a signal line;
   b. means for attenuating the digitized signal and forming a filtered signal, the means for attenuating coupled to the means for receiving; and
   c. microprocessor means for determining whether the electrical energy represents a tone, noise or speech coupled to the means for receiving and the means for attenuating, the microprocessor means comprising:
      i. means for decimating the filtered signal and forming a decimated signal;
      ii. means for correlating a second plurality of neighboring portions of the decimated signal and calculating a maximum;
      iii. first means for determining if the maximum exceeds a first predetermined threshold and reporting noise present if the predetermined threshold is not exceeded;
      iv. means for performing a Fast Fourier Transform analysis of the decimated signal and identifying a first, a second and a third largest frequency-domain maxima;
      v. second means for determining if both the first and second largest frequency-domain maxima exceed a second predetermined threshold and reporting speech present if either the first or the second largest frequency-domain maxima exceed the second predetermined threshold; and
      vi. third means for determining whether a ratio of the first largest to the third largest frequency-domain maxima exceeds a third predetermined value and reporting a tone present if the ratio is larger than the third predetermined value.

11. The apparatus as claimed in claim 10 wherein the means for attenuating comprises a low-pass digital filter.

12. The apparatus as claimed in claim 11 further comprising a storage register for storing data samples while the data samples are being processed, the storage register coupled to the microprocessor means.

13. The apparatus as claimed in claim 12 wherein the second plurality of neighboring portions comprises three neighboring portions.

* * * * *

UNITED STATES PATENT AND TRADEMARK OFFICE
CERTIFICATE OF CORRECTION

PATENT NO. : 5,319,703
DATED : Jun. 7, 1994
INVENTOR(S) : Drory

It is certified that error appears in the above-identified patent and that said Letters Patent is hereby corrected as shown below:

In column 3, line 25, equation [1], please replace "+" with -- ÷ --.

In column 4, line 11, please replace "energy" with --invention--.

Signed and Sealed this

Sixth Day of September, 1994

Attest:

BRUCE LEHMAN

*Attesting Officer*  *Commissioner of Patents and Trademarks*